US008384779B2

(12) United States Patent
Kawashima

(10) Patent No.: US 8,384,779 B2
(45) Date of Patent: Feb. 26, 2013

(54) DISPLAY DEVICE FOR VEHICLE

(75) Inventor: Mitsunori Kawashima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1564 days.

(21) Appl. No.: 11/438,782

(22) Filed: May 22, 2006

(65) Prior Publication Data

US 2006/0268006 A1 Nov. 30, 2006

(30) Foreign Application Priority Data

May 24, 2005 (JP) ................................ P2005-151292

(51) Int. Cl.
*H04N 7/18* (2006.01)
(52) U.S. Cl. ........................................................ 348/148
(58) Field of Classification Search ................... 348/148
See application file for complete search history.

(56) References Cited

U.S. PATENT DOCUMENTS

| 5,289,321 | A | * | 2/1994 | Secor | 359/896 |
| 5,670,935 | A | * | 9/1997 | Schofield et al. | 340/461 |
| 5,959,555 | A | * | 9/1999 | Furuta | 340/937 |
| 6,400,405 | B2 | * | 6/2002 | Tomida et al. | 348/333.05 |
| 6,621,421 | B2 | * | 9/2003 | Kuriya et al. | 340/932.2 |
| 2003/0081122 | A1 | * | 5/2003 | Kirmuss | 348/148 |

FOREIGN PATENT DOCUMENTS

| JP | 01-227577 | 9/1989 |
| JP | 08-253059 | 10/1996 |
| JP | 2001-023091 | 1/2001 |
| JP | 2004-289738 | 10/2004 |
| JP | 2005-110207 | 4/2005 |

\* cited by examiner

*Primary Examiner* — David Czekaj
*Assistant Examiner* — Chikaodili E Anyikire
(74) *Attorney, Agent, or Firm* — O'Melveny & Myers LLP

(57) ABSTRACT

A display device for a vehicle which includes: an image-taking unit which takes images of an area ahead of the vehicle at predetermined intervals; a display which displays the images taken by the image-taking unit; and a controller which divides a display area of the display into a plurality of areas including a center area and a right-and-left side area, wherein the controller sets a first interval for the image-taking unit for taking images to be displayed in the right-and-left side area of the display to become longer than a second interval for the image-taking unit for taking images to be displayed in the center area.

12 Claims, 4 Drawing Sheets

DISPLAY DEVICE FOR VEHICLE

BACKGROUND OF THE INVENTION

1. Field of the Invention

The present invention relates to a display device for a vehicle.

Priority is claimed on Japanese Patent Application No. 2005-151292, filed May 24, 2005, the content of which is incorporated herein by reference.

2. Description of Related Art

A driving support system for a vehicle which detects conditions of roads based on images of the area ahead of the vehicle is known (see, for example, Japanese Unexamined Patent Application, First Publication No. H08-253059). In the support system, the images are captured by a camera disposed in the vehicle, and images made by the system, reflecting the conditions of roads detected by the system, are displayed on a display provided on the front window or on the dashboard of the vehicle.

In the driving support system of the related art, it has been impossible to modify the contents of the image to be displayed in accordance with changes of traveling conditions of the vehicle or the ability of occupants to view the surroundings because the images are made only based on the images captured by the camera. Therefore, there has been a problem in that the support system cannot assist the occupant's ability to view the surroundings when this ability declines in accordance with a change of the traveling conditions of the vehicle.

SUMMARY OF THE INVENTION

The present invention was made in view of the aforementioned circumstances, and it has as an object to provide a display device for a vehicle which can properly assist an occupant's ability to view the surroundings, this ability declining in accordance with traveling conditions of the vehicle.

A first aspect of the present invention is a display device for a vehicle, including an image-taking unit which takes images of an area ahead of the vehicle at predetermined intervals; a display which displays the images taken by the image-taking unit; and a controller which divides the display area of the display into a plurality of areas including a center area and right-and-left side area, wherein the controller sets a first interval for the image-taking unit for taking images to be displayed in the right-and-left side area to become longer than a second interval for the image-taking unit for taking images to be displayed in the center area.

In the aforementioned display device, a displaying period of the images of areas in the occupant's field of view where the ability of the occupant to view the surroundings relatively declines during driving (that is, images displayed in the right-and-left side area) is extended in accordance with an extension of the first interval. Therefore, the display device can allow the occupant to view the images properly and compensate for the declined ability even when kinetic vision of the occupant declines and its field of view is narrowed in accordance with a change in traveling conditions of the vehicle (for example, acceleration).

The display device of the present invention may further include a velocity measuring unit which measures a velocity of the vehicle, wherein the controller controls a width of the center area to be narrower and controls a width of the right-and-left side area to be wider in accordance with an increase of the velocity measured by the velocity measuring unit.

In this case, the display device can compensate for the occupant's declined ability to view the surroundings by widening the right-and-left side area when the field of view of the occupant is narrowed in accordance with an increase of the velocity of the vehicle.

The image-taking unit may include a first camera which takes images to be displayed in the right-and-left side area and a second camera which takes images to be displayed in the center area, and the controller may set a shutter speed of the first camera to be faster than a shutter speed of the second camera.

In this case, the display device can provide clearer images by making the shutter speed for images to be displayed on the right-and-left side area faster than that for images to be displayed on the center area; thereby the occupant's ability to view the surroundings when driving can be improved.

The controller may control the display so as to display a moving picture taken by the image-taking unit in the center area. In this case, the display device allows the occupant to view the surroundings as if the occupant were actually viewing the surroundings by displaying moving pictures in the field of view of the occupant when the occupant's ability to view the surroundings is maintained when driving (that is, the center area).

The display device of the present invention may further include a steering angle sensor which measures a steering angle of the vehicle, wherein the controller determines one of a direction of image taking of the image-taking unit and areas in the images taken by the image-taking unit to be displayed in the display, in accordance with the steering angle measured by the steering angle sensor.

In this case, when the controller sets an area in images taken by the image-taking unit and controls the display to display images of the area, appropriate images can be displayed in both the center area and the right-and-left side area in accordance with the driver's intention in driving, and thereby the driver's ability to view the surroundings can be properly assisted.

DETAILED DESCRIPTION OF THE INVENTION

Figure 1:
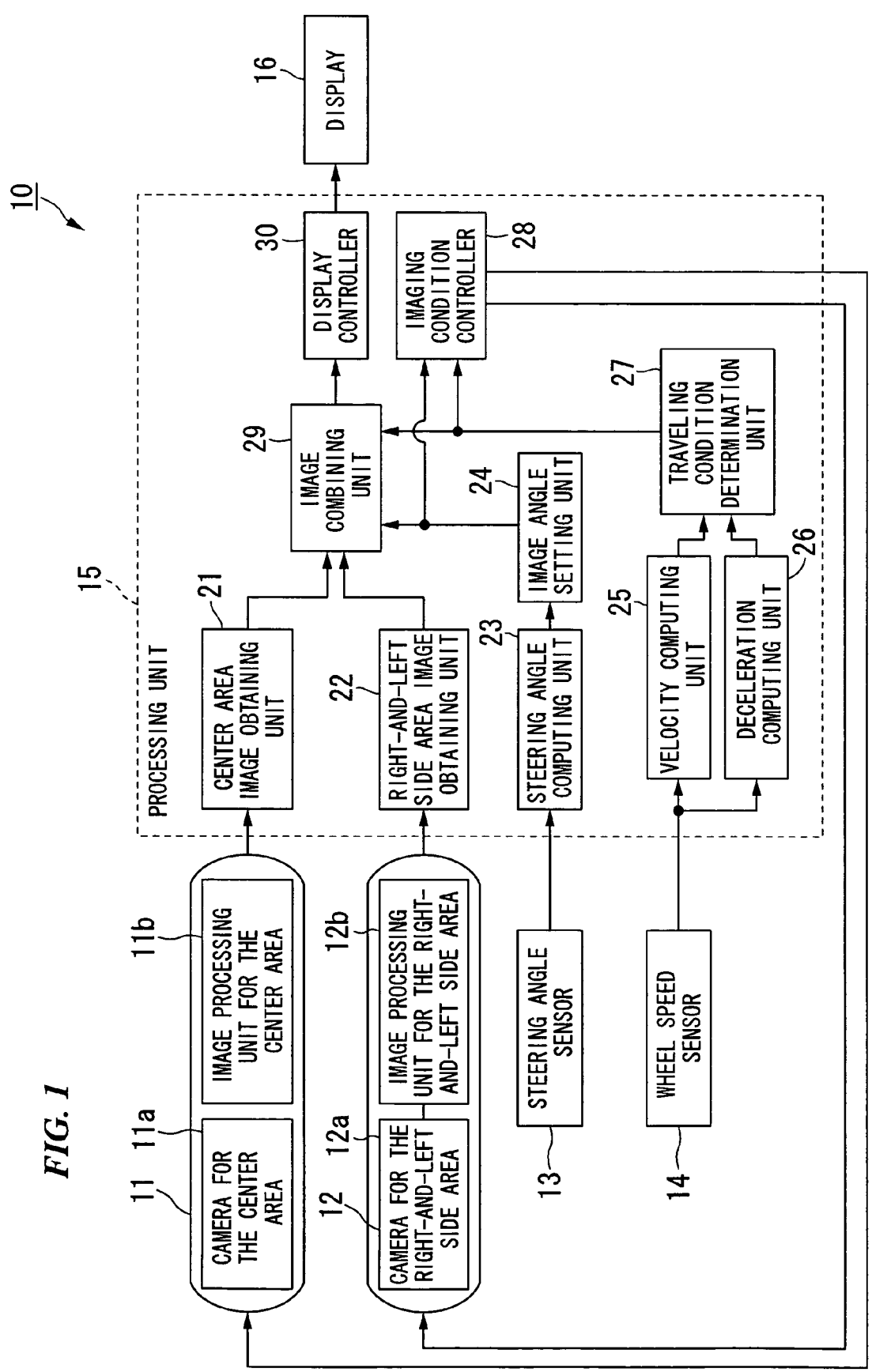
FIG. 1 is a diagram showing a constitution of a display device for a vehicle of an embodiment of the present invention.

Hereinbelow, a display device for a vehicle of an embodiment of the present invention is described with reference to the accompanying drawings. As shown in FIG. 1, a display device 10 of the present embodiment has a center area imaging unit 11, a right-and-left side area imaging unit 12, a steering angle sensor 13, a wheel speed sensor 14, a processing unit 15 having an electrical circuit including a CPU, and a display 16.

The center area imaging unit 11 has a camera 11*a* for the center area and an image processing unit 11*b* for the center area, and the right-and-left side imaging unit 12 has a camera 12*a* for the right-and-left side area and an image processing unit 12*b* for right-and-left side area.

The cameras 11a and 12a are cameras such as a CCD camera or a CMOS camera which can obtain images in the range of visible light or in the infrared range. The cameras 11a and 12a are disposed in a cabin of the vehicle and obtain images of a predetermined area ahead of the vehicle through a windshield.

The processing units 11b and 12b generate images for the center area and the right-and-left side area consisting of pixels of a two-dimensional array by performing a predetermined processing such as filtering and binarization on the images obtained by the cameras 11a and 12a and send them to the processing unit 15.

The steering angle sensor 13 is, for example, a rotary encoder disposed on a steering pivot. The steering angle sensor 13 measures the direction and the magnitude of the steering angle operated by a driver (the steering angle of a steering wheel). The wheel speed sensor 14 measures the rotation speed of each wheel of the vehicle.

The constitution of the processing unit 15 shall be described. A center area image obtaining unit 21 obtains images for the center area from the center area imaging unit 11 and sends them to an image combining unit 29. A right-and-left side area image obtaining unit 22 obtains images for the right-and-left side area from the right-and-left side area imaging unit 12 and sends them to the image combining unit 29. A steering angle computing unit 23 computes the direction and the magnitude of the steering angle (the actual steering angle of the vehicle) based on a signal showing the direction and the magnitude of the steering angle sent from the steering angle sensor 13. An imaging angle setting unit 24 sets imaging directions and imaging angles (for example, the imaging angle with respect to a horizontal line) of the cameras 11a and 12a in accordance with the actual steering angle computed by the steering angle computing unit 23. The imaging angle setting unit 24 outputs information about the imaging direction to an imaging condition controller 28 and to the image combining unit 29.

A velocity computing unit 25 computes the velocity of the vehicle based on the rotation speed of each wheel sent from the wheel speed sensor 14. A deceleration computing unit 26 computes the deceleration of the vehicle based on the rotation speed of each wheel sent from the wheel speed sensor 14. A traveling condition determination unit 27 determines the traveling condition of the vehicle based on the velocity of the vehicle computed by the velocity computing unit 25 and the deceleration of the vehicle computed by the deceleration computing unit 26. The traveling condition determination unit 27 outputs a result of the determination to the imaging condition controller 28 and to the image combining unit 29.

The imaging condition controller 28 controls the imaging angles of the cameras 11a and 12a based on the information about the imaging directions of the cameras 11a and 12a sent from the imaging angle setting unit 24. The imaging condition controller 28 also controls the timing of imaging and the shutter speed of the camera 11a for the center area and the camera 12a for the right-and-left side area based on the determination result on the traveling condition of the vehicle determined by the traveling condition determination unit 27.

Figure 2:
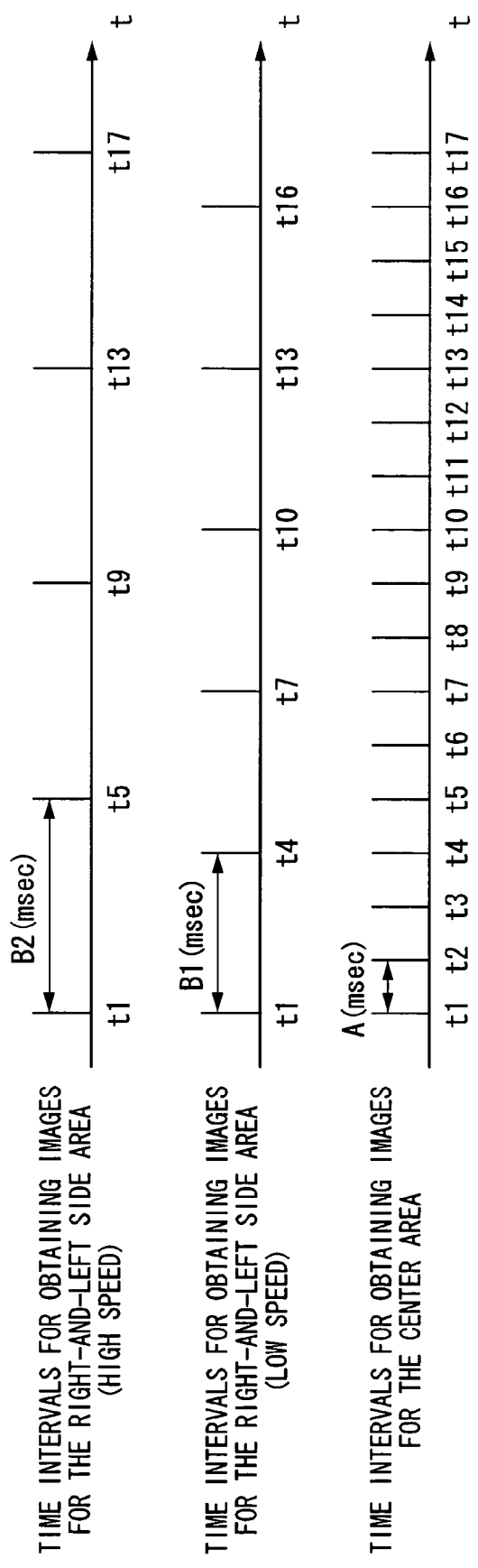
FIG. 2 is a diagram showing an example of timings for obtaining images for the center area and the right-and-left side area, in a vehicle at low speed and high speed.
Figure 3:
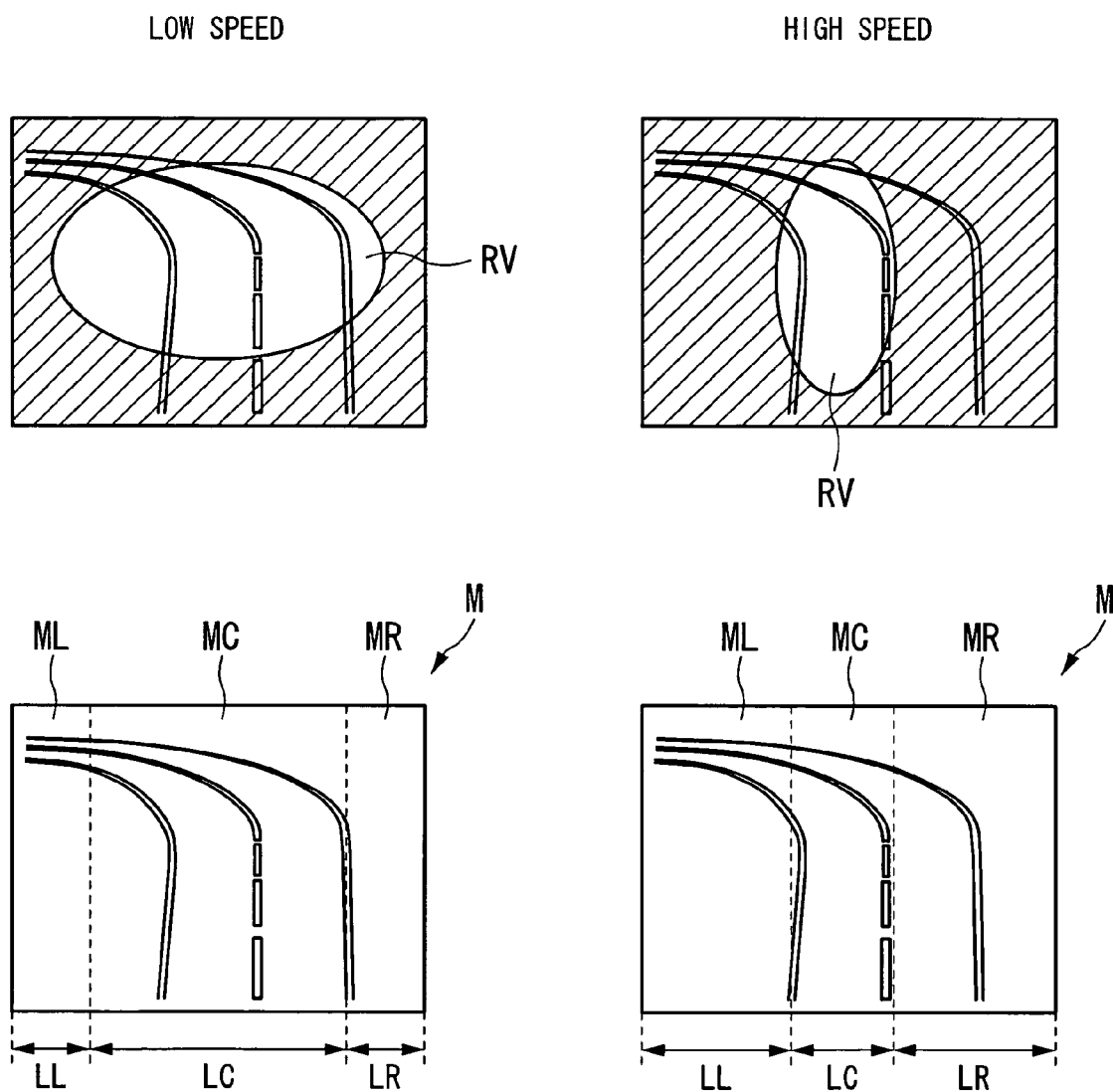
FIG. 3 is a diagram showing an example of the field of view of a driver and a combined image.

For example, the imaging condition controller 28 sets an interval B (in milliseconds) for image obtaining for the right-and-left side area imaging unit 12 such that it is longer than an interval A (in milliseconds) for image obtaining for the center area imaging unit 11. The controller 28 also increases the interval B in accordance with an increase of the vehicle velocity (for example, as an interval B1 is extended to an interval B2 shown in FIG. 2). Furthermore, the controller 28 sets the shutter speed of the right-and-left side imaging unit 12 such that it is faster than the shutter speed of the center area imaging unit 11.

The image combining unit 29 generates a combined-image by combining an image for the center area sent from the center area image obtaining unit 21 with an image for the right-and-left side area sent from the right-and-left side area image obtaining unit 22 based on the information about the imaging directions of the cameras 11a and 12a sent from the imaging angle setting unit 24 and the determination result on the traveling condition of the vehicle determined by the traveling condition determination unit 27. The image combining unit 29 outputs the combined-image to a display controller 30.

For example, the image combining unit 29 determines an area of the image for the center area sent from the center area image obtaining unit 21. The area of the image determined by the combining unit 29 constitutes a center portion MC in the horizontal direction of a combined-image M and is displayed in the center area of the display 16. At the same time, the image combining unit 29 determines areas of the image for the right-and-left side area sent from the right-and-left side area image obtaining unit 22. The areas of the image determined by the combining unit 29 constitutes a left portion ML and a right portion MR in the horizontal direction of the combined-image M and is displayed in the right-and-left side area of the display 16. The combined-image M is thus generated.

At this time, the image combining unit 29 determines the position and the shape of areas to be extracted from images for the center area C and images for the right-and-left side area in accordance with the information about the imaging directions of the cameras 11a and 12a.

In addition, when acceleration is detected by the traveling condition determination unit 27, the field of view of the driver becomes narrower, therefore the image combining unit 29 reduces the width of the center area of the display 16 (that is, the width LC of the center portion MC of the combined-image M). At the same time, the image combining unit 29 increases the width of the right-and-left side area of the display 16 (that is, the width LL and LR of the left portion ML and the right portion MR of the combined-image M). The width LC is set to a predetermined minimum width (a width equivalent to the width of a lane of a road or slightly wider than that is displayed on the display).

The display controller 30 drives the display 16 which in turn displays the combined-image sent from the image combining unit 29.

The display device 10 of the present embodiment has the aforementioned constitution and the operation thereof shall be described below.

Figure 4:
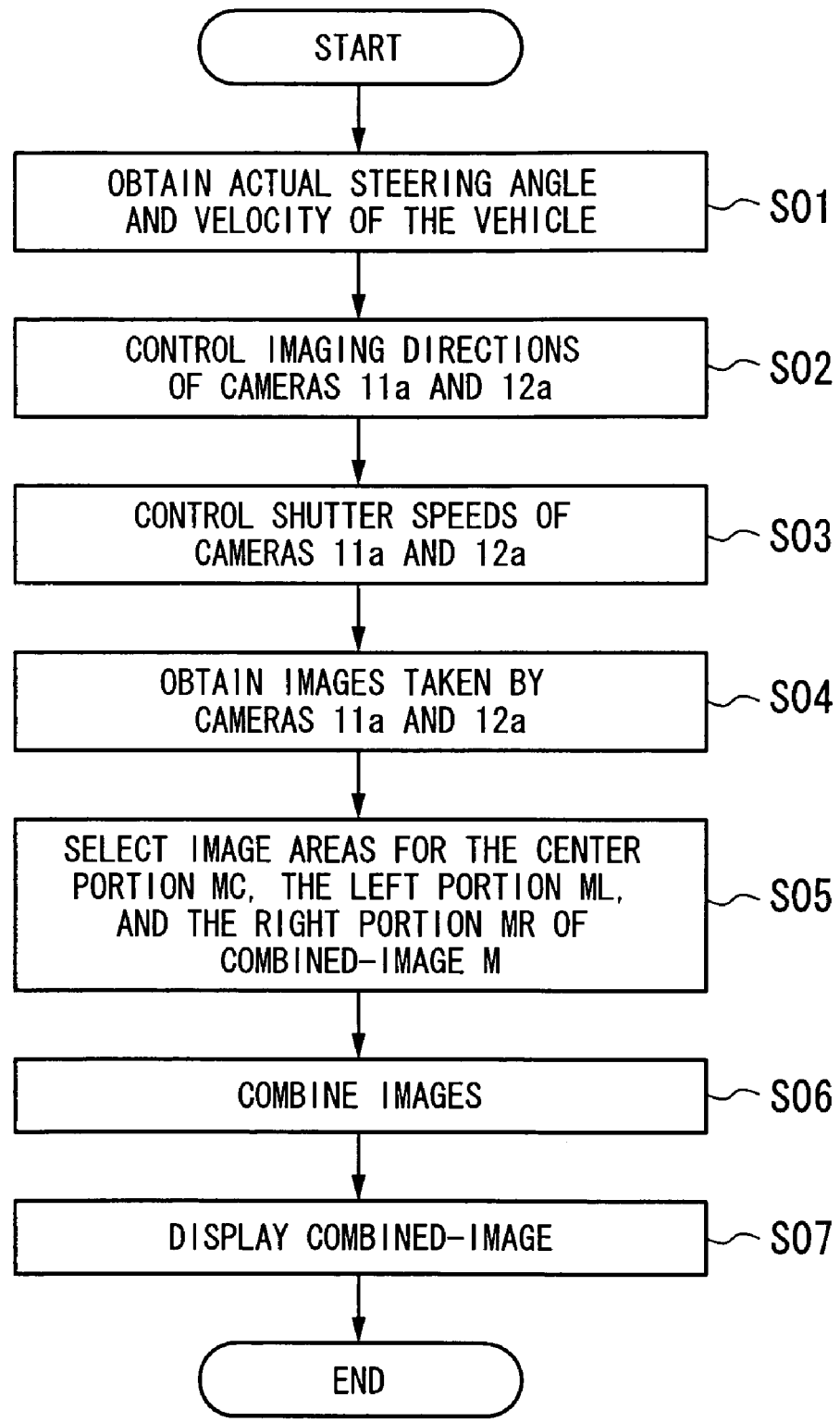
FIG. 4 is a flowchart showing the operation of the display device of the present embodiment.

First, in step S01 shown in FIG. 4, the imaging angle setting unit 24 obtains the information about the actual steering angle of the vehicle which is computed based on a signal from the steering angle sensor 13, and the traveling condition determination unit 27 obtains information about the velocity of the vehicle which is computed based on a signal from the wheel speed sensor 14.

In step S02, the imaging angle setting unit 24 sets the imaging directions of the camera 11a for the center area and the camera 12a for the right-and-left side area in accordance with the actual steering angle of the vehicle.

In step S03, the imaging condition controller 28 controls each shutter speed of the cameras 11a and 12a in accordance with the velocity of the vehicle.

In step S04, the center area image obtaining unit 21 obtains images for the center area taken by the camera 11a and the right-and-left side area image obtaining unit 22 obtains images for the right-and-left side area taken by the camera 12a.

In step S05, the image combining unit 29 obtains an area of image to be the center portion MC of the combined-image M from images for the center area and areas of image to be the left portion ML and the right portion MR of the combined-image M from images for the right-and-left side area. At this time, the image combining unit 29 sets the width LC of the center portion MC, the width LL of the left portion ML, and the width LR of the right portion MR in accordance with the velocity of the vehicle, and determines the areas of the obtained images for the portions MC, ML, and MR in accordance with the actual steering angle of the vehicle.

In step S06, the image combining unit 29 generates the combined-image M by combining the portions MC, ML, and MR.

In step S07, the display controller 30 drives the display 16 which in turn displays the combined-image M and terminates the processing.

Through the aforementioned steps, when the kinetic vision of the occupant declines and the field of view RV is narrowed in accordance with a change in the traveling condition of the vehicle (particularly acceleration), the display device displays images for the right-and-left side area in a portion of the display which corresponds to areas in the field of view where the occupant's ability to see relatively declines (that is, the right-and-left side area of the display 16). The obtaining interval and display period for the right-and-left side area images are set relatively longer than those for the images for the center area. The width of the right-and-left side area is set to be increased in accordance with acceleration for compensating for the occupant's declined ability to view properly.

In addition, clearer still images are displayed in the right-and-left side area than in the center area because the images for the right-and-left side area are obtained with relatively faster shutter speed.

On the other hand, in the field of view where the occupant's ability to see is maintained (that is, the center area of the display 16), images for the center area which are obtained under a relatively shorter obtaining interval are displayed. The display period of the images for the center area is set relatively shorter than that of the images for the right-and-left side area. Since the images for the center area are obtained with relatively slower shutter speed, continuity is emphasized among the consecutive images. As a result, images which look like a moving picture are displayed as if the occupant were actually watching.

As described, the display device 10 of the present embodiment can properly assist the occupant's ability to view the surroundings, an ability which declines in accordance with the traveling condition of the vehicle when the kinetic vision of the occupant declines and the field of view is narrowed in accordance with a change in a traveling condition (e.g., acceleration) by displaying images obtained in a relatively longer interval and relatively faster shutter speed in areas of the display corresponding to areas in field of view where the occupant's ability to view relatively declines.

Though this embodiment has the camera 11a for the center area and the camera 12a for the right-and-left side area, it is not limited thereto. For example, the display device may have only one camera. In this case, images for the center portion MC of the combined-image M and images for the left portion ML and the right portion MR are obtained under intervals different from each other and the combined-image M is generated by combining images for each portion. At this time, the obtaining interval for the portions ML and MR is set longer than that of the portion MC. In a case of low speed in FIG. 2, a relatively faster shutter speed is set when the timing of image obtaining for the portions ML and MR and the timing for the center portion MC are aligned, as indicated by points t1, t4, and t7, and a relatively slower shutter speed is set when only images for the center portion MC are obtained as indicated by points t2, t3, and t5.

In addition, though the image taking directions of the cameras 11a and 12a are set in accordance with the actual steering angle computed by the steering angle computing unit 23, it is not limited thereto. For example, the cameras 11a and 12a may be cameras of wider angle and images for the portion MC and images for the portions ML and MR may be selected from images taken by the cameras 11a and 12a in accordance with the actual steering angle computed by the steering angle computing unit 23.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device for a vehicle, comprising:
an image-taking unit which takes images of an area ahead of the vehicle at predetermined intervals;
a display which displays the images taken by the image-taking unit; and
a controller which divides a display area of the display into a plurality of areas including a center area and a right-and-left side area, wherein
the images taken by the image-taking unit includes at least a first image to be displayed in the right-and-left side area of the display and at least a second image to be displayed in the center area of the display;
the first and second images are displayed simultaneously on the display; and
the controller sets a first interval for the image-taking unit for taking at least the first image to become longer than a second interval for the image-taking unit for taking at least the second image.

2. The display device according to claim 1, further comprising:
a velocity measuring unit which measures a velocity of the vehicle,
wherein the controller controls a width of the center area to be narrower and controls a width of the right-and-left side area to be wider in accordance with an increase of the velocity measured by the velocity measuring unit.

3. The display device according to claim 1,
wherein the image-taking unit includes a first camera which takes images to be displayed in the right-and-left side area and a second camera which takes images to be displayed in the center area, and
wherein the controller sets a shutter speed of the first camera to be faster than a shutter speed of the second camera.

4. The display device according to claim 1,
wherein the controller controls the display so as to display a moving picture taken by the image-taking unit in the center area.

5. The display device according to claim 1, further comprising:
a steering angle sensor which measures a steering angle of the vehicle, wherein the controller determines one of a direction of image taking of the image-taking unit and areas in the images taken by the image-taking unit to be displayed in the display, in accordance with the steering angle measured by the steering angle sensor.

6. The display device according to claim 2,
wherein the image-taking unit includes a first camera which takes images to be displayed in the right-and-left side area and a second camera which takes images to be displayed in the center area, and
wherein the controller sets a shutter speed of the first camera to be faster than a shutter speed of the second camera.

7. The display device according to claim 2,
wherein the controller controls the display so as to display a moving picture taken by the image-taking unit in the center area.

8. The display device according to claim 2, further comprising:
a steering angle sensor which measures a steering angle of the vehicle, wherein
the controller determines one of a direction of image taking of the image-taking unit and areas in the images taken by the image-taking unit to be displayed in the display, in accordance with the steering angle measured by the steering angle sensor.

9. The display device according to claim 3, further comprising:
a steering angle sensor which measures a steering angle of the vehicle, wherein
the controller determines one of a direction of image taking of the image-taking unit and areas in the images taken by the image-taking unit to be displayed in the display, in accordance with the steering angle measured by the steering angle sensor.

10. The display device according to claim 4, further comprising:
a steering angle sensor which measures a steering angle of the vehicle, wherein
the controller determines one of a direction of image taking of the image-taking unit and areas in the images taken by the image-taking unit to be displayed in the display, in accordance with the steering angle measured by the steering angle sensor.

11. The display device according to claim 6, further comprising:
a steering angle sensor which measures a steering angle of the vehicle, wherein
the controller determines one of a direction of image taking of the image-taking unit and areas in the images taken by the image-taking unit to be displayed in the display, in accordance with the steering angle measured by the steering angle sensor.

12. The display device according to claim 7, further comprising:
a steering angle sensor which measures a steering angle of the vehicle, wherein
the controller determines one of a direction of image taking of the image-taking unit and areas in the images taken by the image-taking unit to be displayed in the display, in accordance with the steering angle measured by the steering angle sensor.

\* \* \* \* \*